(12) United States Patent
Wang et al.

(10) Patent No.: US 11,215,108 B2
(45) Date of Patent: Jan. 4, 2022

(54) HIGH-LOW TEMPERATURE RADIATOR FOR INTERNAL COMBUSTION ENGINE ENGINEERING MACHINERY

(71) Applicant: Qingdao Auto Radiator Co., Ltd., Qingdao (CN)

(72) Inventors: Dengfeng Wang, Qingdao (CN); Qiaoguang Sui, Qingdao (CN); Xiaodong Feng, Qingdao (CN)

(73) Assignee: Qingdao Auto Radiator Co., Ltd., Qingdao (CN)

( * ) Notice: Subject to any disclaimer, the term of this patent is extended or adjusted under 35 U.S.C. 154(b) by 0 days.

(21) Appl. No.: 17/016,199

(22) Filed: Sep. 9, 2020

(65) Prior Publication Data
US 2021/0079834 A1    Mar. 18, 2021

(30) Foreign Application Priority Data
Sep. 17, 2019    (CN) .......................... 201921540362.4

(51) Int. Cl.
| | |
|---|---|
| *F01P 11/02* | (2006.01) |
| *F01P 3/18* | (2006.01) |
| *B60K 11/04* | (2006.01) |
| *F28D 21/00* | (2006.01) |

(52) U.S. Cl.
CPC ............... *F01P 11/02* (2013.01); *B60K 11/04* (2013.01); *F01P 3/18* (2013.01); *F01P 2025/08* (2013.01); *F01P 2060/045* (2013.01); *F28D 2021/0094* (2013.01)

(58) Field of Classification Search
CPC .. F01P 11/02; F01P 2025/08; F01P 2060/045; F01P 3/18; F01P 2003/182; F01P 2003/185; F01P 2003/187; B60K 11/04; B60K 11/02; B60K 11/00; F28D 2021/0094
See application file for complete search history.

(56) References Cited

U.S. PATENT DOCUMENTS

| | | | | |
|---|---|---|---|---|
| 4,620,509 | A | * | 11/1986 | Crofts ................... F28D 1/0417 123/41.1 |
| 2005/0006067 | A1 | * | 1/2005 | Hoglinger ............. F28D 1/0443 165/140 |

* cited by examiner

*Primary Examiner* — Jacob M Amick

(57) ABSTRACT

The present disclosure relates to a novel high-low temperature radiator for internal combustion engine engineering machinery, which is provided with a water inlet pipe, a water inlet chamber, a radiator core body, a water outlet chamber, a water separation plate and a water outlet pipe which are sequentially communicated, the water inlet pipe is communicated with the water inlet chamber, and the water inlet chamber is communicated with the radiator core body; the radiator core body is divided into two parts: a radiator low-temperature core body and a radiator high-temperature core body; the water outlet chamber is divided into two parts: a low-temperature water outlet chamber and a high-temperature water outlet chamber, and the water outlet pipe is divided into a low-temperature water outlet pipe and a high-temperature water outlet pipe according to the core body and the water chamber from which the cooling liquid flows.

4 Claims, 2 Drawing Sheets

HIGH-LOW TEMPERATURE RADIATOR FOR INTERNAL COMBUSTION ENGINE ENGINEERING MACHINERY

TECHNICAL FIELD

The present disclosure relates to the field of internal combustion engine cooling, in particular to a novel high-low temperature radiator for internal combustion engine engineering machinery.

BACKGROUND

At present, most internal combustion engine engineering machinery adopts a liquid cooling mode and is provided with an oil cooler, and a radiator is usually used for cooling the internal combustion engine in an air-cooling mode. The operation of engineering machinery is realized by hydraulic mechanism which generates heat when working and is cooled by hydraulic oil cooler. The mechanical transmission, the hydraulic coupler, the hydraulic torque converter of the engineering machinery all uses transmission oil, which generates heat at work and is cooled by a transmission oil cooler. The working temperature of transmission oil is relatively high with the maximum temperature about 115° C., an air cooling mode is adopted or a liquid cooling mode is adopted, the working temperature of hydraulic oil is relatively low with the maximum temperature generally not exceeding 95° C., which is very close to the water outlet temperature of an internal combustion engine, and an air cooling mode is generally adopted. In the working process, the heat of the cylinder body of the internal combustion engine is absorbed by cooling liquid, the cooling liquid is conveyed to an external radiator by utilizing the power of a water pump, and then the heat is exchanged into natural air by a fan; after the temperature of the hydraulic oil or the transmission oil rises in work, the hydraulic oil or the transmission oil is conveyed to an external oil cooler by virtue of oil pump power, if the oil cooler adopts an air cooling mode, heat is exchanged into natural air through a fan, and if the oil cooler adopts a liquid cooling mode, heat is exchanged into cooling liquid.

In the prior art, the maximum water outlet temperature of an internal combustion engine is usually not more than 97° C., the water inlet temperature is usually 91° C., the oil inlet temperature of a hydraulic oil cooler is about 95° C., and the oil outlet temperature is about 89° C. Because the temperature difference between water and oil is too small, the cooling liquid cannot be used for cooling the hydraulic oil, therefore, the hydraulic oil cooler is usually air cooled, with long and complicated oil pipeline, large oil resistance, difficult space layout, difficult design and high failure rate.

SUMMARY

The present disclosure aims to provide a novel high-low temperature radiator for internal combustion engine engineering machinery so as to overcome the defects, provide a radiator with higher efficiency, simple installation and convenient use.

In order to achieve the above object, the technical scheme of the present disclosure is as follows: a novel high-low temperature radiator for internal combustion engine engineering machinery, wherein the radiator is provided with a water inlet pipe, a water inlet chamber, a radiator core body, a water outlet chamber, a water separation plate and a water outlet pipe which are sequentially communicated, the water inlet pipe is communicated with the water inlet chamber, and the water inlet chamber is communicated with the radiator core body; the radiator core body is divided into two parts, a radiator low-temperature core body and a radiator high-temperature core body, according to the temperature drop range of cooling liquid and the sequence of cooling air entering; the water separation plate is provided in the middle of the water outlet chamber, the water outlet chamber is divided into two parts, a low-temperature water outlet chamber and a high-temperature water outlet chamber by the water separation plate, and the water outlet pipe is divided into a low-temperature water outlet pipe and a high-temperature water outlet pipe according to the core body and the water chamber from which the cooling liquid flows.

Further, the radiator low-temperature core body is a core body of the radiator core body at an air inlet side, and the radiator high-temperature core body is a core body of the radiator core body at an air outlet side.

Further, the low-temperature core body of the radiator is connected with the low-temperature water outlet chamber, and the high-temperature core body of the radiator is connected with the high-temperature water outlet chamber.

Further, the low-temperature water outlet chamber is connected with the low-temperature water outlet pipe, and the high-temperature water outlet chamber is connected with the high-temperature water outlet pipe.

In the device, the low-temperature cooling liquid flowing out from the low-temperature water outlet pipe is converged with the high-temperature cooling liquid flowing out from the high-temperature water outlet pipe after subsequent heat exchange is completed, and enters an internal combustion engine cylinder body to cool the internal combustion engine by virtue of power of a water pump.

The beneficial effect of the present disclosure is that in the present disclosure, the radiator core body is divided into two parts: a radiator low-temperature core body and a radiator high-temperature core body; the water outlet chamber is divided into a low-temperature water outlet chamber and a high-temperature water outlet chamber; the water outlet pipe is divided into a low-temperature water outlet pipe and a high-temperature water outlet pipe. High-temperature cooling liquid flowing out from the internal combustion engine enters the radiator core body, part of the high-temperature cooling liquid enters the radiator low-temperature core body, part of the high-temperature cooling liquid enters the radiator high-temperature core body, the cooling air firstly cools the radiator low-temperature core body and then cools the radiator high-temperature core body, the temperature drop range of the cooling liquid flowing through the radiator low-temperature core body is large, the cooling liquid flowing out becomes low-temperature cooling liquid, the temperature drop range of the cooling liquid flowing through the radiator high-temperature core body is small, the cooling liquid flowing out becomes high-temperature cooling liquid, and the low-temperature cooling liquid is used for cooling high-temperature hydraulic oil and high-temperature transmission, then merges with the high temperature coolant to enter into the internal combustion engine. The radiator is simple in structure, convenient to mount and high in efficiency, the use cost is saved, and the use efficiency is improved.

DETAILED DESCRIPTION OF THE EMBODIMENTS

The specific embodiments of the present disclosure will be described below in conjunction with the accompanying drawings for a better understanding of the present disclosure.

Figure 1:
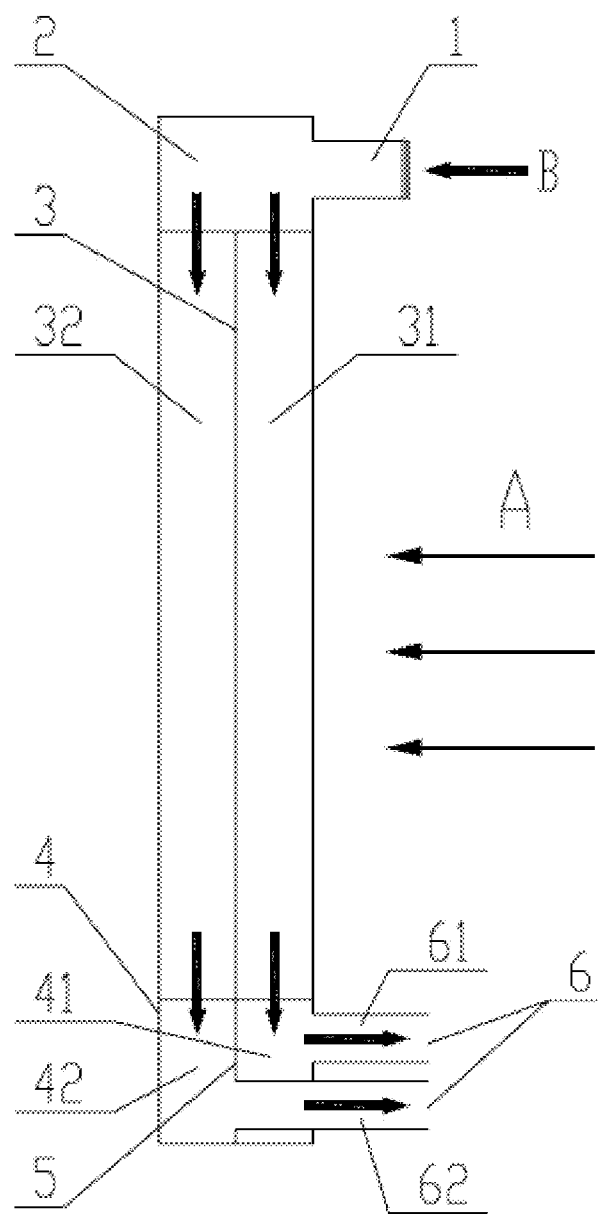
FIG. 1 is a schematic view showing the structure of the device of the present disclosure.
Figure 2:
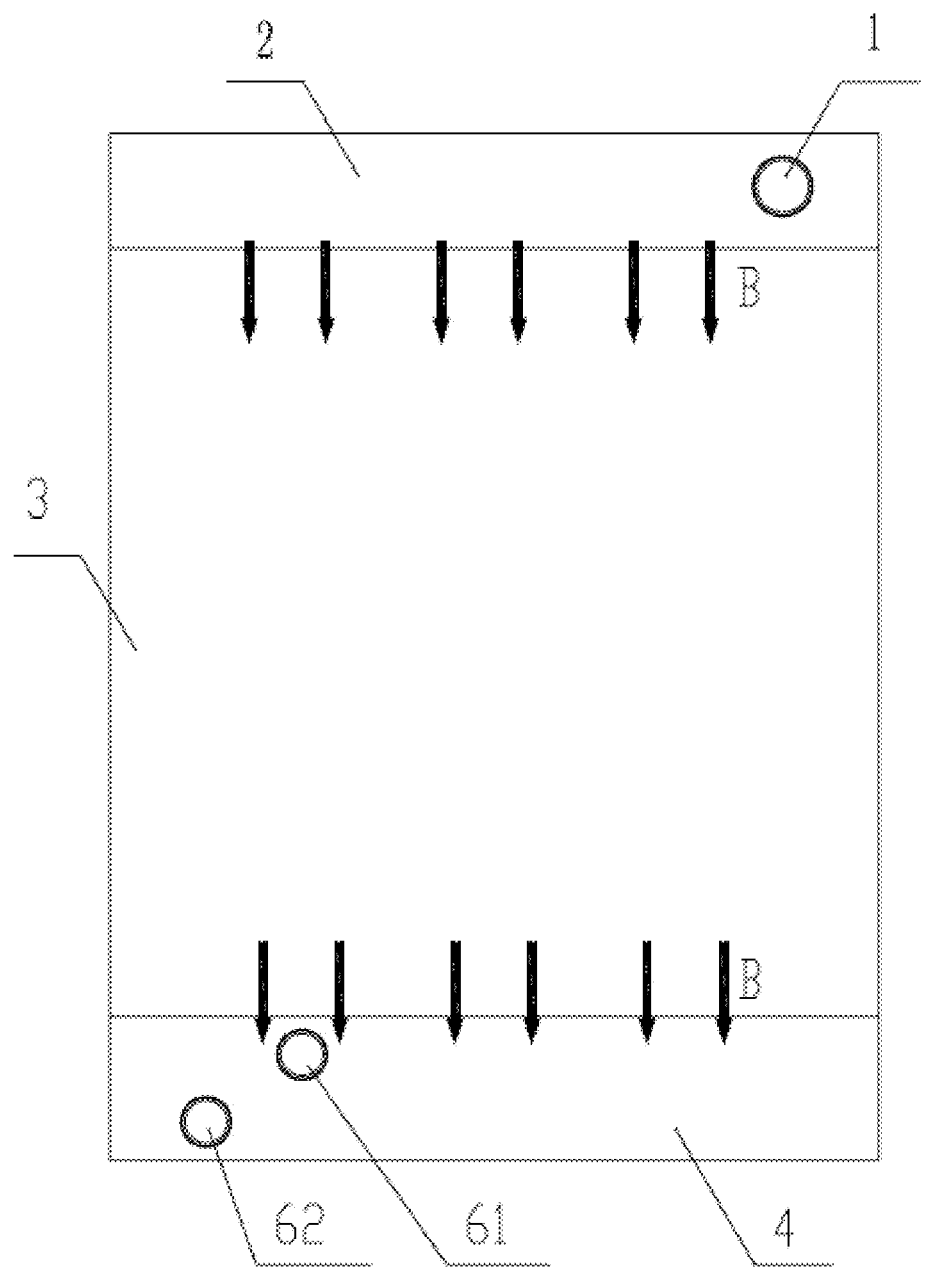
FIG. 2 is a side view of the device of the present disclosure.

A high-low temperature radiator for an internal combustion engine engineering machinery as shown in FIGS. 1 and 2, comprising: a water inlet pipe 1, a water inlet chamber 2, a radiator core body 3, a water outlet chamber 4, a water separation plate 5 and a water outlet pipe 6 which are sequentially communicated, the water inlet pipe 1 is communicated with the water inlet chamber 2, the water inlet chamber 2 is communicated with the radiator core body 3, and the radiator core body 3 is divided into two parts, a radiator low-temperature core body 31 and a radiator high-temperature core body 32 according to the temperature drop range of cooling liquid and the sequence of cooling air entering; the water separation plate 5 is provided in the middle of the water outlet chamber 4, the water outlet chamber 4 is divided into two parts, a low-temperature water outlet chamber 41 and a high-temperature water outlet chamber 42 by the water separation plate, and the water outlet pipe 6 is divided into a low-temperature water outlet pipe 61 and a high-temperature water outlet pipe 62 according to the core body and the water chamber from which the cooling liquid flows; the radiator low-temperature core body 31 is a core body of the radiator core body 3 at air inlet side, the radiator high-temperature core body 32 is a core body of the radiator core body 3 at air outlet side, cooling air firstly cools the radiator low-temperature core body 31, and then cools the radiator high-temperature core body 32. The radiator low-temperature core 31 is connected with the low-temperature water outlet chamber 41, and the radiator high-temperature core 32 is connected with the high-temperature water outlet chamber 42. The low-temperature water outlet chamber 41 is connected with the low-temperature water outlet pipe 61, and the high-temperature water outlet chamber 42 is connected with the high-temperature water outlet pipe 62. The low-temperature cooling liquid flowing out from the low-temperature water outlet pipe 61 is converged with the high-temperature cooling liquid flowing out from the high-temperature water outlet pipe 62 after subsequent heat exchange is completed, and enters an internal combustion engine cylinder body to cool the internal combustion engine by virtue of power of a water pump.

In the embodiment of the present disclosure, the water inlet pipe 1 is connected with the water outlet pipe of the internal combustion engine, when the internal combustion engine works, high-temperature cooling liquid is output from the water outlet pipe of the internal combustion engine and enters the water inlet pipe 1 of the radiator as shown at B in FIG. 1, then enters the water inlet chamber 2, a part of the cooling liquid enters the low-temperature core body 31 of the radiator, a part of the cooling liquid enters the high-temperature core body 32 of the radiator, and cooling air entering from the outside firstly enters the low-temperature core body 31 of the radiator to cool the cooling liquid with cooling air temperature increasing and cooling liquid temperature decreasing, as shown in A in FIG. 1, after the heat exchange is finished, the cooling liquid in the low-temperature core body 31 of the radiator enters the low-temperature water outlet chamber 41, flows through the low-temperature water outlet pipe 61 and is output to the outside, the cooling air cools the low-temperature core body 31 of the radiator and then enters the high-temperature core body 32 of the radiator to cool the cooling liquid therein, the temperature of the cooling air continues to increase, the temperature of the cooling liquid decreases, and after the heat exchange is finished, the cooling liquid in the high-temperature core body 32 of the radiator enters the high-temperature water outlet chamber 42, flows through the high-temperature water outlet pipe 62, and is output to the outside. When the cooling air enters the low-temperature core body 31 of the radiator, the temperature of the cooling air is low, the temperature difference between the cooling air and the cooling liquid in the low-temperature core body 31 of the radiator is large, the cooling air cooling capacity is large, so the cooling liquid in the low-temperature core body 31 of the radiator is cooled greatly, the cooling liquid output from the low-temperature core body 31 of the radiator becomes low-temperature cooling liquid. After the cooling air cools the low-temperature core body 31 of the radiator, the temperature is increased greatly, the cooling air enters the high-temperature core body 32 of the radiator, at the moment, the temperature difference between the heated cooling air and the cooling liquid in the high-temperature core body 32 of the radiator is small, the cooling capacity of the cooling air is small, therefor, the cooling liquid in the high-temperature core body 32 of the radiator is cooled little, and the cooling liquid output from the high-temperature core body 32 of the radiator becomes the high-temperature cooling liquid. The cooling liquid output from the low-temperature water outlet pipe 61 is used for cooling the hydraulic oil and the transmission oil, and then is mixed with the high-temperature cooling liquid and enters the internal combustion engine to cool the internal combustion engine. According to the test, the cooling range of the low-temperature cooling liquid is generally 2.5 to 3 times that of the high-temperature cooling liquid. In internal combustion engine engineering machinery, if two oil coolers are removed, the radiator carries cooling of the internal combustion engine, hydraulic oil and transmission oil, the front surface area of the radiator core body is increased by about 80% compared with that of a common internal combustion engine radiator, the engine water outlet temperature of engineering machinery at 95° C. and the temperature of the low-temperature cooling liquid flowing out from the low-temperature radiator core body are reduced by about 15 to 18° C. and the temperature is about 77 to 80° C., the cooling requirement of hydraulic oil can be met by matching an appropriate oil cooler.

The above are the preferred embodiments of the present disclosure, it should be noted that for those skilled in the art, without departing from the principle of the present disclosure, several improvements and modifications can be made, and these improvements and modifications are also considered as the protection scope of the present disclosure.

What is claimed is:

1. A novel high-low temperature radiator for internal combustion engine engineering machinery, wherein the radiator is provided with a water inlet pipe, a water inlet chamber, a radiator core body, a water outlet chamber, a water separation plate and a water outlet pipe which are sequentially communicated, the water inlet pipe is communicated with the water inlet chamber, and the water inlet chamber is communicated with the radiator core body; the radiator core body is divided into two parts, a radiator low-temperature core body and a radiator high-temperature core body, according to the temperature drop range of cooling liquid and the sequence of cooling air entering; the water inlet pipe is connected with the water outlet pipe of the internal combustion engine, and part of the high-temperature coolant flowing out of the internal combustion engine enters the low-temperature core of the radiator, and part enters the high-temperature core of the radiator; the water separation plate is provided in the middle of the water outlet chamber, the water outlet chamber is divided into two parts, a low-temperature water outlet chamber and a high-temperature water outlet chamber by the water separation plate, and the water outlet pipe is divided into a low-temperature water outlet pipe and a high-temperature water outlet pipe according to the core body and the water chamber from which the cooling liquid flows; Wherein, the low-temperature coolant flowing out of the low-temperature water outlet pipe and the high-temperature coolant flowing out of the high-temperature water outlet pipe are merged, and enter the cylinder of the internal combustion engine by the power of the water pump to cool the internal combustion engine.

2. The novel high-low temperature radiator for internal combustion engine engineering machinery of claim 1, wherein the radiator low-temperature core body is a core body of the radiator core body at an air inlet side, and the radiator high-temperature core body is a core body of the radiator core body at an air outlet side.

3. The novel high-low temperature radiator for internal combustion engine engineering machinery of claim 1, wherein the low-temperature core body of the radiator is connected with the low-temperature water outlet chamber, and the high-temperature core body of the radiator is connected with the high-temperature water outlet chamber.

4. The novel high-low temperature radiator for internal combustion engine engineering machinery of claim 1, wherein the low-temperature water outlet chamber is connected with the low-temperature water outlet pipe, and the high-temperature water outlet chamber is connected with the high-temperature water outlet pipe.

* * * * *